United States Patent [19]

Groos

[11] Patent Number: 4,766,280
[45] Date of Patent: Aug. 23, 1988

[54] WIRE ELECTRODE FOR THE SPARK EROSIVE CUTTING

[75] Inventor: Heinrich Groos, Herborn, Fed. Rep. of Germany

[73] Assignee: Berkenhoff GmbH, Heuchelheim, Fed. Rep. of Germany

[21] Appl. No.: 14,143

[22] Filed: Feb. 12, 1987

Related U.S. Application Data

[63] Continuation of Ser. No. 722,103, Apr. 11, 1985, abandoned.

[30] Foreign Application Priority Data

Apr. 21, 1984 [DE] Fed. Rep. of Germany ....... 3415055

[51] Int. Cl.$^4$ .......................... B23H 7/08; B23H 7/22
[52] U.S. Cl. ................................ 219/69 W; 204/206; 219/69 E
[58] Field of Search ............... 219/69 W, 69 E, 69 M; 204/206, 280; 140/71.5, 149; 72/299, 371

[56] References Cited

U.S. PATENT DOCUMENTS

| | | | |
|---|---|---|---|
| 392,119 | 10/1888 | Hardsocg | 72/299 |
| 603,868 | 5/1898 | Atkins | 140/149 |
| 3,128,799 | 4/1964 | Kerr | 140/149 |
| 3,154,112 | 10/1964 | Jacques | 140/149 |
| 4,026,137 | 5/1977 | Scroggins | 72/299 |
| 4,418,263 | 11/1983 | Inoue | 219/69 W |
| 4,448,655 | 5/1984 | Inoue | 219/69 W |
| 4,475,996 | 10/1984 | Inoue | 219/69 W |
| 4,508,604 | 4/1985 | Inoue | 219/69 W |

FOREIGN PATENT DOCUMENTS

| | | | |
|---|---|---|---|
| 145196 | 12/1978 | Japan | 219/69 W |
| 152531 | 11/1981 | Japan | 219/69 M |
| 126026 | 7/1983 | Japan | 219/69 W |
| 2129720 | 5/1984 | United Kingdom | 72/299 |
| 848237 | 7/1981 | U.S.S.R. | 219/69 E |

Primary Examiner—Roy N. Envall, Jr.
Assistant Examiner—Geoffrey S. Evans
Attorney, Agent, or Firm—Flynn, Thiel, Boutell & Tanis

[57] ABSTRACT

To increase the cutting performance of a wire electrode for electroerosive cutting, the surface of the wire electrode is provided with projections and recesses created by twisting the wire electrode of polygonal cross section about its axis.

9 Claims, 3 Drawing Sheets

CROSS SECTION A-B

WIRE ELECTRODE PROFILES

WIRE ELECTRODE FOR THE SPARK EROSIVE CUTTING

This application is a continuation of U.S. Ser. No. 722,103, filed Apr. 11, 1985, now abandoned.

FIELD OF THE INVENTION

The invention relates to a method for the manufacture of a wire electrode for electroerosive cutting of electrically conducting workpieces, which has a surface with projections and recesses, and a wire electrode which is manufactured according to the method.

BACKGROUND OF THE INVENTION

A wire electrode of the abovementioned type is known from Offenlegungsschrift No. 31 45 907 (Corresponds to U.S. Pat. No. 4,448,655), in which the surface has projections and recesses. This irregular surface is obtained either through sandblasting or grooving, or, however, also by pulling the wire through a rotating matrix form. Moreover, it is known from this reference to make the surface rough by etching or coats of powder. A particularly advantageous solution is seen in interweaving several wires with one another or, however, in winding a thinner wire onto a thicker carrying wire. The producing of a surface which has recesses by means of a rotating matrix form cannot be carried out for economical reasons, since the wire would have to be advanced at a relatively slow speed, while the matrix form would have to be rotated extremely quickly. Of concern in regard to the other methods for deforming the surface of an eroding wire is that one obtains only irregular surfaces with grooving and sand blasting, which surfaces as a rule are not well suited to remove the eroded material which has accumulated in the cutting gap from the gap. Of concern in regard to the winding of a thin wire onto a thick carrying core, just like the twisting of several thin wires with one another, there exists here on the one hand the disadvantage that this method is relatively expensive from an economics point of view, especially since here the thin wires must have a considerably smaller diameter than the diameter of the eroding wire. The manufacture of thin wires, however, is very complicated and expensive. Moreover, the twisting of the wires with one another and also the winding of a thin wire onto a thicker core is also relatively expensive. However, the main disadvantage is noticeable during eroding. The thin wires have a tendency to burn through first which has the result that the ends stay and rest directly on the workpiece which is to be cut. This results in the eroding wire burning to ashes on the workpiece which is to be cut and thus causing the cutting operation to be interrupted. The eroding wire thus must then be threaded in again and the cutting operation must be started anew.

The basic purpose of the invention is to manufacture an eroding wire of the abovementioned type in an economical manner so that it is provided with such a surface suited to quickly and safely remove the eroded material from the cutting gap and which in spite of this continues to have a high strength and a good electric conductivity.

An inventively constructed eroding wire is thus manufactured of wire having a polygonal cross section. The cross section can be triangular or, however, also square or rectangular. It is also conceivable to use a cross section having more than four corners. This cross-sectional shape of the eroding wire can be obtained in a simple manner by rolling a round wire. The wire is thereafter twisted so that the corners of the wire run helically on same. A rectangular wire has proven to be most advantageous in view of a large cavity inside of the peripheral surface of the wire. An eroding wire according to the invention thus maintains its full cross section, so that its strength and electric-conducting capability is not influenced by creating an irregular surface. Moreover, the helical deformation of the wire has proven to be extremely effective for guiding the eroded material out of the cutting gap, so that the cutting performance was able to be increased considerably. Moreover, the wire electrode has on all sides the same flexibility, which is a condition for a constant cutting performance.

An inventive wire electrode thus works according to the principle of the socalled conveyor worm and transports the dielectric which contains many cut particles at the wire electrode speed out of the narrow working gap.

The lateral free spaces and the surface enlargement of the wire electrode permit a quick discharge of the cut particles and feed always nonused dielectric liquid to the gap. With this the flushing operations are enormously strengthened and much higher removal rates are achieved.

Furthermore, a profiling of the wire electrode creates self-stability, which stability, also due to the favorable water-pressure principles in the working gap, results in a lesser enlargement of the eroding surface of the workpiece.

BRIEF DESCRIPTION OF THE DRAWINGS

One exemplary embodiment of the invention will be described in greater detail hereinbelow with reference to the drawings, in which.

DETAILED DESCRIPTION

Figure 1:
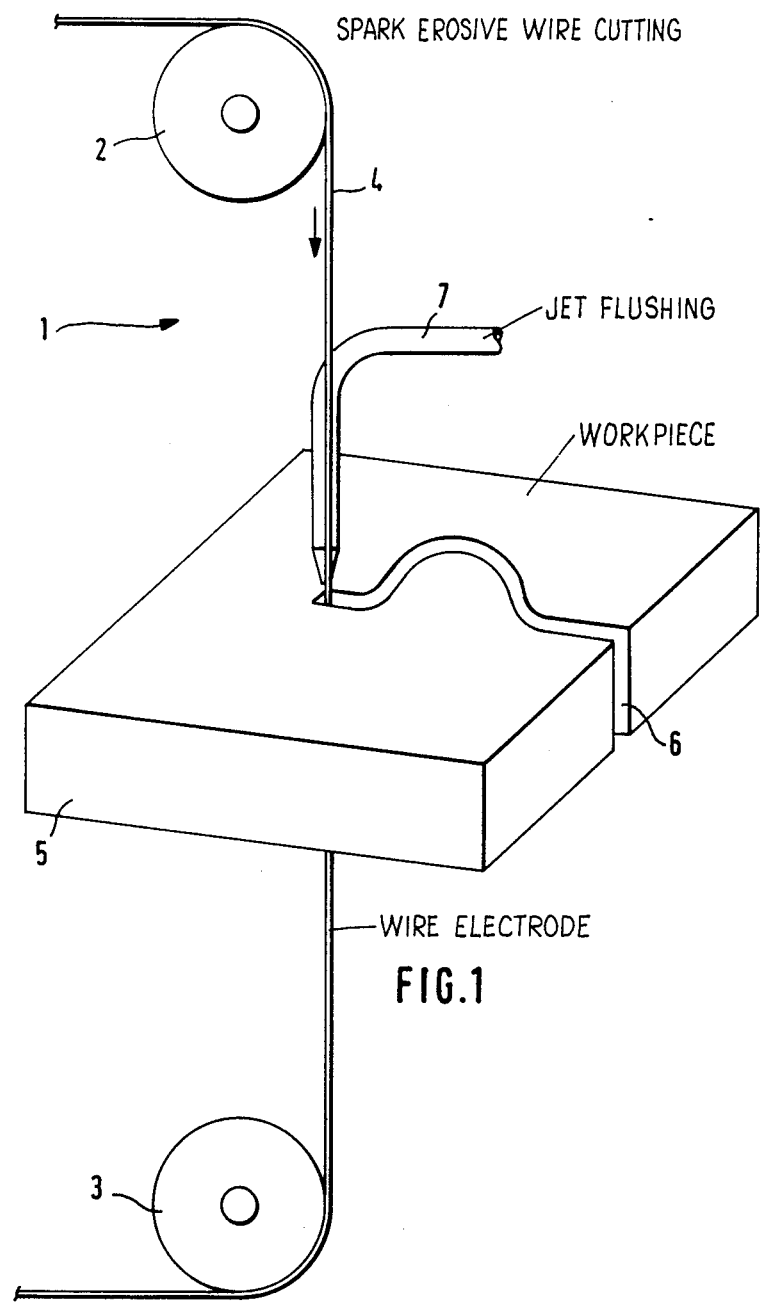
FIG. 1 is a schematic illustration of a wire electrode during a cutting of a workpiece.
Figure 2A:
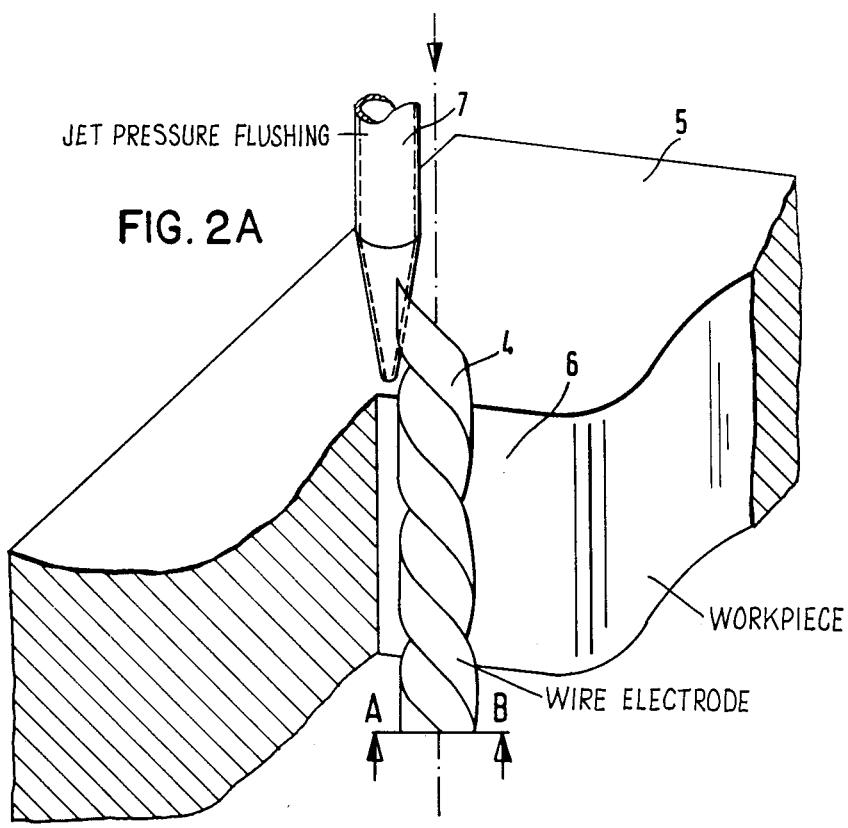
FIG. 2A illustrates a section of FIG. 1 in an enlarged illustration and with the workpiece being partially broken away.
Figure 2B:
FIG. 2B is a section of the wire before it is twisted and along the line A-B of FIG. 2A.

The cutting device 1 which is illustrated in FIG. 1 consists of two guide rollers 2, 3, over which a wire electrode 4 is guided.

Figure 3:
FIG. 3 are different cross sections of an inventively constructed wire electrode.

A workpiece 5 is cut by the wire electrode 4, whereby the cut groove is identified by the reference numeral 6. A working fluid is supplied through a feed pipe 7 which extends parallel with respect to the wire electrode 4. The working fluid is of a dielectric nature or consists of an electrolyte with a suitable conductance. With the help of the working fluid, the cut groove 6 and also the working gap which is forming between the wire electrode and the workpiece is flushed. The working gap has only very small dimensions, which lie between 0.01 and 0.05 mm. In order to prevent cut particles from accumulating in the working gap, in spite of an intensive jet nozzle flushing, the wire electrode is inventively manufactured as a single wire having one of the solid cross-sectional shapes shown in FIG. 3. Each of these shapes assures that the cut particles will be discharged by the forward movement of the wire downwardly and also partly past the wire to the rear, which results in a substantial increase in the cutting performance.

Figures 4A, 4B:
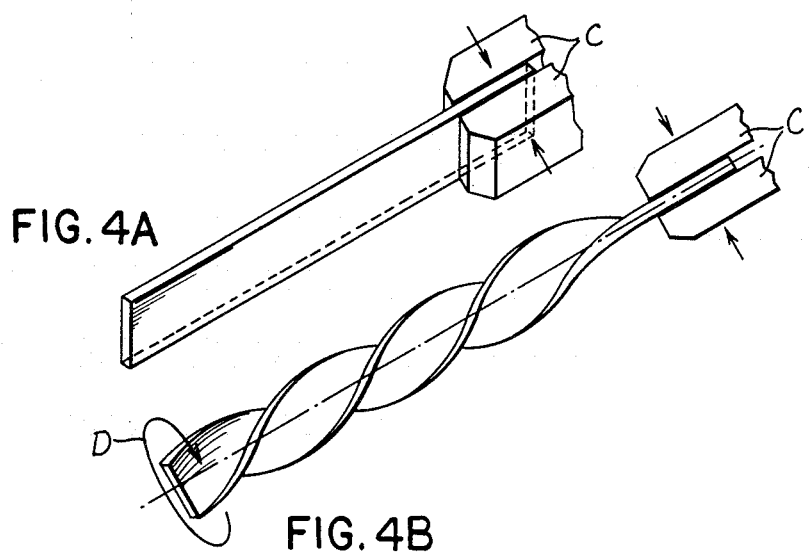
FIGS. 4A and 4B are schematical illustrations of a method for twisting a noncircular wire about its longitudinal axis.

The wire electrode can be polygonal in cross section, such as a square, a triangle or a rectangle. This wire is twisted by fixing one end in a clamp C and rotatingly driving the other end as schematically shown by the arrow D in FIG. 4B, so that the edges extend helically along the axis of the wire. One obtains in this manner a type of a conveyor screw, which has advantageous characteristics particularly in view of the effective removal of the cut particles.

Such a wire can be manufactured of a round wire, which is advantageously rolled to a rectangular cross section and is subsequently twisted in a twisting device, so that the edges extend helically along the wire core. Depending on the degree of twisting of the wire, the twist can have a larger or smaller pitch The embodiments of the invention in which an exclusive property or privilege is claimed are defined as follows:

1. In a method for the manufacture of wire electrodes for the electroerosive cutting of electrially conducting workpieces, which have a surface with projections and recesses, the improvement comprising wherein the wire electrode is manufactured of a flexible single solid wire having a polygonal cross section by twisting the wire about its central longitudinal axis, and forming during the aforesaid twisting the longitudinal edges on said polygonal cross-sectioned wire into a helical shape to define a helical recess therebetween, said solid polygonal cross section being fully retained throughout the length of said wire electrode so that electrical current loads and strength characteristics will be unaffected by the formation of said helically formed recesses.

2. The method according to claim 1, wherein the wire has a rectangular cross section.

3. The method according to claim 1, wherein the wire has a square cross section.

4. The method according to claim 1, wherein the wire has a triangular cross section.

5. A wire electrode for the electroerosive cutting of electrically conducting workpieces, wherein the wire electrode is a flexible single wire which has a solid polygonal cross section and is twisted about its central longitudinal axis, and wherein longitudinally extending edges on said polygonal cross-sectioned wire are helically formed to define a helical recess therebetween, said solid polygonal cross section being fully retained throughout the length of said wire electrode so that electrical current loads and strength characteristics will be unaffected by the formation of said helically formed recesses.

6. The wire according to claim 5, wherein said polygonal shape is rectangular.

7. The wire according to claim 5, wherein said polygonal shape is triangular.

8. The wire according to claim 5, wherein said polygonal shape is square.

9. The wire according to claim 5, wherein said polygonal shape has at least five corners.

* * * * *